Oct. 12, 1948.　　　A. I. NEWMAN　　　2,450,981
FLASK HEATER
Filed April 25, 1945
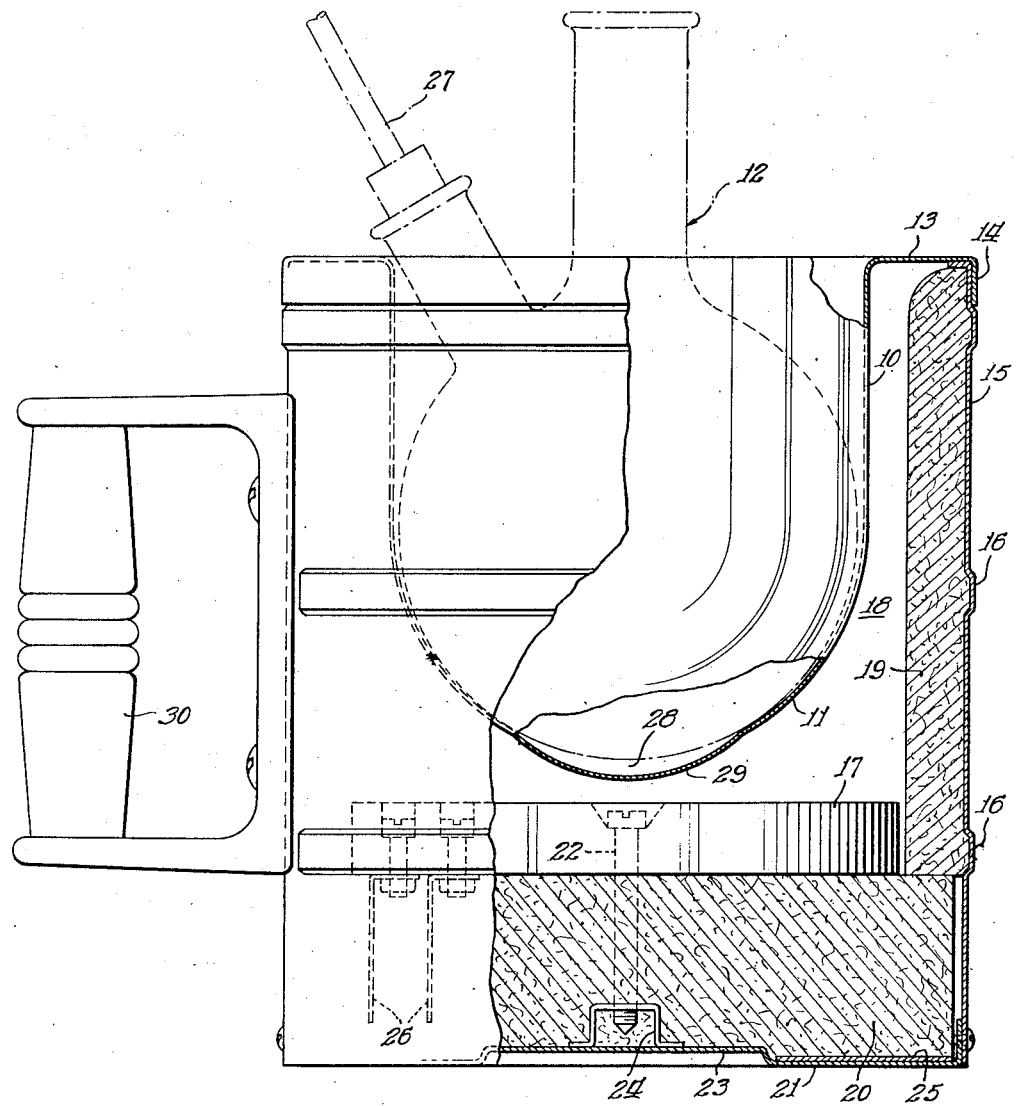
Inventor:
Alexander I. Newman Patented Oct. 12, 1948

2,450,981

UNITED STATES PATENT OFFICE 2,450,981

FLASK HEATER

Alexander I. Newman, River Forest, Ill., assignor to Precision Scientific Co., Chicago, Ill., a corporation of Illinois Application April 25, 1945, Serial No. 590,256

1 Claim. (Cl. 219—43)

This invention relates to flask heaters.

Among other objects, the invention aims to provide a flask heater capable of more accurate temperature control.

Another object is to provide an electrical flask heater in which residual heat in the heater does not continue to elevate the flask temperature after interruption of heating current.

Another object is to provide a flask heater with a bowl of such shape as to conform closely to the flask to be heated and of such capacity as to hold the entire contents of the flask in case of breakage.

Another object is to provide a flask heater in which flasks having inflammable contents may be safely heated.

A further object is to provide a flask heater in which the vapor in the flask is not superheated.

A still further object is to provide a flask heater in which local ebullition ("bumping") in the flask is prevented.

Other objects and advantages will become apparent from the following description of one illustrative apparatus embodying the invention and shown in the accompanying drawing.

The figure in the drawing is an elevation, partly in section, of the heater.

The illustrative flask heater embodies an electric heater enclosed to prevent exposure to inflammable or corrosive contents of the flask, and a flask holding bowl which is capable of holding and preserving the flask contents if the flask break. In the illustrative heater, the holding bowl 10 preferably has a bottom 11, hemispherical in this case, corresponding as closely as practicable to the shape of the bottom of the conventional flask 12, shown here in dot and dash lines seated inside and in contact with the bowl. The bowl is deep enough to hold the entire contents of the flask if the latter break. The bowl 10 may advantageously be pressed of stainless steel or Monel metal though other metals may be employed in cases where resistance to corrosion is relatively unimportant. Preferably, it is seamless and provided with an integral flange 13 extending over the heater top to prevent access of liquids and inflammable vapors into the interior of the heater and particularly to the heating element. Preferably the top is also provided with an integral rim flange 14 which fits over and outside the top of a sheet metal jacket 15 surrounding the heater. The jacket is advantageously formed with stiffening ribs 16.

I have discovered that temperatures may be much more closely controlled and superheating avoided by spacing the electric heater from the flask (i. e., the exterior of the bowl 10) and surrounding the bowl by an air space, and heating partly by air convection. Thus substantially no heat is transmitted to the bowl by conduction of heat stored in the solid material comprising the heater. One such arrangement is shown in the illustrative heater wherein the electric heating element 17 is preferably located a distance below the bottom of the bowl, and an air space 18 is provided around the sides of the bowl. The heating element does not follow the contour of the bowl and in this case is flat. It heats the bottom of the bowl mainly by radiant heat and the sides of the bowl (being both at an angle to the heating element and substantially distant therefrom) almost entirely by air convection. The relatively close fit between flask and bowl, i. e., the small intervening air space, makes heating in part by convection practicable. With a bowl having a convex bottom as in the present case, it is preferable to space the heater somewhat from the bottom of the bowl so as not excessively to heat a limited spot on the bowl as would be the case if the heater contacted the bowl at one point. The sheet metal jacket 16 has an inner layer 19 of insulation surrounding the air space and another layer 20 overlies a sheet metal bottom 21 below the heating element, thereby forming an annular casing having insulated bottom and side walls. The latter is connected to the bottom 21 of the heater by a retaining screw 22 which is preferably of fired clay or some other thermal and electrical nonconductor. In the region of this connection, the bottom is advantageously stiffened by dishing it inwardly at 23. The connecting screw is here shown threaded into a stirrup 24 carried by the bottom. The interior of the bottom is made flush by an asbestos filler ring 25 surrounding the inwardly dished area. Heating element terminals are represented at 26. These lead by an appropriate connection to the exterior.

Any appropriate method (automatic or manual) of heater current control may be employed. Some form of heat register, here represented by a thermometer 27, is generally inserted into the flask itself so that temperature control may be effected by direct reference to the temperature of the flask contents. Residual heat in the heating element and the interior of the heater does not appreciably elevate temperature of the flask contents (after interruption of heater current) because little heat can be transmitted by conduction and the convection air holds little heat (having very low specific heat) and practically immediately cools to the temperature of the bowl. Transmission of radiant heat also substantially immediately ceases, since radiant heat varies as the cube or even higher power of the temperature of the heating element. This need fall only a few degrees (upon interruption of current) to reduce transmission of radiant heat to a negligible amount. Conversely, and for the same reasons, closing of the heater circuit substantially immediately results in transmission of heat by radiation and convection to the flask. This permits close regulation of flask temperatures, that is, it minimizes fluctuation of flask temperatures above or below the desired temperature.

Superheating of the vapor above the liquid in the flask (i. e., heating of the vapor to temperatures above those indicated by the thermometer, which responds only to the temperature of the liquid contents of the flask) is prevented, since it is difficult to transmit heat by convection directly to the vapor. Hence, the latter is heated almost entirely by the liquid itself and obviously cannot become hotter than the liquid. Substantially no radiant heat can reach the vapor since the liquid lies between the vapor and the source of radiant heat. Furthermore, since radiant heat varies inversely as the square of the distance it must travel, little radiant heat would in any event reach the remotely located vapor.

In the region of closest proximity to the heating element, an additional air space 28 is provided to prevent local ebullition ("bumping") of the liquid in the flask due to local superheating of the liquid by concentration of a large portion of the radiant heat in this limited region. Bumping often causes breakage of the flask. Such air space is provided in the present case by forming a lens-shaped bulge 29 in the bowl so as to leave an air space 28 between the bowl and the flask in this region.

If preservation of flask contents (upon breakage) be unimportant, an oil or sand bath may be employed in the bowl for transmitting heat to the flask. Otherwise, heating is effected by an air bath or, as here shown, by placing the flask in direct contact with the bowl.

The heater may be provided with any suitable bracket (not shown) for mounting the heater on the usual laboratory support. A handle 30 is preferably attached to the jacket 15 for convenience in manipulating the heater.

Obviously, the invention is not limited to details of the illustrative apparatus since these may be variously modified. Moreover, it is not indispensable that all features of the invention be used conjointly since various features may be used to advantage in different combinations and subcombinations.

I claim as my invention:

A flask heater of the character described comprising, in combination, a seamless metallic flask holding bowl of such shape and size as to correspond relatively closely with the flask to be heated therein and an integral flange extending over the entire top of the heater, said flange having a depending marginal rim, an insulating jacket joining said flange and located inside said ring, said jacket being spaced from the sides of said bowl to provide an air space around said bowl, a relatively flat electric heating element spaced below the hemispherical bottom of said bowl and adapted to heat said bottom by radiant heat and also to heat the air in said space for delivering heat to the sides of said bowl by air convection, said bowl being offset at the point of closest proximity to said heater to provide an air space between said bowl and the bottom of the flask resting in the bowl, a layer of insulation at the bottom of said heater, and a nonmetallic connection connecting said heating element to the bottom of the heater.

ALEXANDER I. NEWMAN.

REFERENCES CITED

The following references are of record in the file of this patent:

UNITED STATES PATENTS

| Number | Name | Date |
|---|---|---|
| 1,323,525 | Dutton | Dec. 2, 1919 |
| 2,033,323 | Camp | Mar. 10, 1936 |
| 2,224,552 | Sickinger | Dec. 10, 1940 |
| 2,282,078 | Morey | May 5, 1942 |

FOREIGN PATENTS

| Number | Country | Date |
|---|---|---|
| 517,312 | France | Dec. 17, 1920 |